US008355364B1

(12) United States Patent
Vargantwar et al.

(10) Patent No.: US 8,355,364 B1
(45) Date of Patent: Jan. 15, 2013

(54) SYSTEMS AND METHODS FOR USING TOPOLOGY TO DETERMINE WHETHER TO GRANT AN ACCESS REQUEST FROM AN ACCESS TERMINAL

(75) Inventors: Sachin Vargantwar, Overland Park, KS (US); Deveshkumar Rai, Overland Park, KS (US); Bhagwan Khanka, Lenexa, KS (US); Sandeep Goyal, Overland Park, KS (US); Anoop Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 310 days.

(21) Appl. No.: 12/572,426

(22) Filed: Oct. 2, 2009

(51) Int. Cl.
*H04W 4/00* (2009.01)
(52) U.S. Cl. ........ 370/328; 370/254; 370/310; 370/342; 455/436
(58) Field of Classification Search .................. None
See application file for complete search history.

(56) References Cited

U.S. PATENT DOCUMENTS

| | | | |
|---|---|---|---|
| 5,890,067 A | 3/1999 | Chang | |
| 6,081,229 A | 6/2000 | Soliman | |
| 6,161,022 A | 12/2000 | Hwang | |
| 6,208,631 B1 * | 3/2001 | Kim ............................. | 370/332 |
| 6,223,041 B1 | 4/2001 | Egner | |
| 6,522,888 B1 * | 2/2003 | Garceran et al. ........... | 455/456.3 |
| 6,526,029 B1 | 2/2003 | Zhong | |
| 6,577,616 B1 * | 6/2003 | Chaudry et al. .............. | 370/342 |
| 6,775,252 B1 | 8/2004 | Bayley | |
| 6,944,454 B1 * | 9/2005 | Lee et al. ...................... | 455/443 |
| 6,970,871 B1 | 11/2005 | Rayburn | |
| 7,190,958 B1 | 3/2007 | Yarkosky | |
| 7,209,758 B1 | 4/2007 | Moll | |
| 7,236,796 B2 | 6/2007 | Soliman | |
| 7,328,027 B1 | 2/2008 | Mangal | |
| 7,433,682 B1 | 10/2008 | Moll | |
| 2003/0114172 A1 | 6/2003 | Soliman | |
| 2004/0259565 A1 * | 12/2004 | Lucidarme ................... | 455/453 |
| 2006/0121855 A1 | 6/2006 | Dillon | |
| 2006/0229087 A1 | 10/2006 | Davis, III | |

OTHER PUBLICATIONS

Openwave, "Overview of Location Technologies," Nov. 19, 2002.
Kjellberg, Richard, Tokyo Bay analyse report, STDMA analyse report, web.archive.org/web/20090427053120/http://www.gpc.se/tokyo/tokyo.htm (Apr. 27, 2009).
Xing, Jianping et al., "Research and Integration of Marine Embedded AIS Information Terminal," Proceedings of the 7th World Congress on Intelligent Control and Automation, Jun. 25-27, 2008, Chongqing, China, pp. 3586-3589.

* cited by examiner

*Primary Examiner* — Jae Y Lee

(57) ABSTRACT

The present invention provides a method and system for determining whether to accept an access request from an AT. In an embodiment of the invention, a base station receives an access request from an AT that is located within a sector served by the base station. In response to receiving the access request, the base station obtains the physical location of the AT within the sector. The base station then determines whether to accept the access request based on the physical location of the AT within the sector.

12 Claims, 6 Drawing Sheets

SYSTEMS AND METHODS FOR USING TOPOLOGY TO DETERMINE WHETHER TO GRANT AN ACCESS REQUEST FROM AN ACCESS TERMINAL

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

A subscriber (or user) in a service provider's wireless communication system accesses the system for communication services via an access terminal, such as a cellular telephone, pager, or appropriately equipped portable computer, for instance. When an access terminal is positioned in a cell, the access terminal (also referred to herein by "AT") communicates via an RF air interface with the BTS antenna of the cell. Consequently, a communication path or "channel" is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

OVERVIEW

An AT initiates a call or data session by transmitting one or more access request messages to its serving base station. More specifically, the AT transmits one or more "access probes" in a sequence to the base station with a random delay between each transmission in order to listen for an acknowledgement from the base station. Once the base station acknowledges an access probe, it assigns a communication channel to the AT, and a call or session is established using the assigned channel. If the AT does not receive an acknowledgement from the base station after transmitting all of the access probes of a given sequence, the AT may attempt access with one or more additional probe sequences as necessary until it either receives an acknowledgment and a traffic-channel assignment, or the attempted access via the base station fails.

The failure of a base station to acknowledge an access probe can be due to a number of reasons, including heavy loading conditions from multiple access terminals attempting access, lack of an available traffic channel, transmission of an access probe at too low a power level for the base station to properly detect, and location of the AT at too great a distance from the base station. In practice, the AT encodes each access request using a form of timing signal that allows the base station to determine the AT's distance from the base station. The base station may then ignore the access probe if the determined distance exceeds a threshold distance, which is defined as the base station's "access search window." When an access attempt via the AT's serving base station fails, the AT may attempt access via a different base station. Typically, a base station's access search window size is fixed, and thus any AT can gain access to that base station if it is within the distance defined by the access search window.

Sectors may cover areas in which the physical topology of the land within the sector is not consistent. Accordingly, an AT within a sector may experience significant signal degradation based on the differing physical topology. For example, the topology of the land within a sector may include an urban area and a lake area. In the lake area, there are no structures to interfere with signals sent between the AT and the base station. In the urban area, however, there are many structures that interfere with the signals. Therefore, an AT at the periphery of a sector in the urban area will experience inferior call fidelity as compared with an AT at the periphery of a sector in the lake area.

Accordingly, embodiments of the present invention provide a method and system for determining whether to accept an access request from an AT. In an embodiment of the invention, a base station receives an access request from an AT that is located within a sector served by the base station. In response to receiving the access request, the base station obtains the physical location of the AT within the sector. The base station then determines whether to accept the access request based on the physical location of the AT within the sector.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. Under IS-2000, packet-data communications are conventionally referred to as "1X-RTT" communications, also abbreviated as just "1X." Packet-data communications under IS-856 are conventionally referred to as "EV-DO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
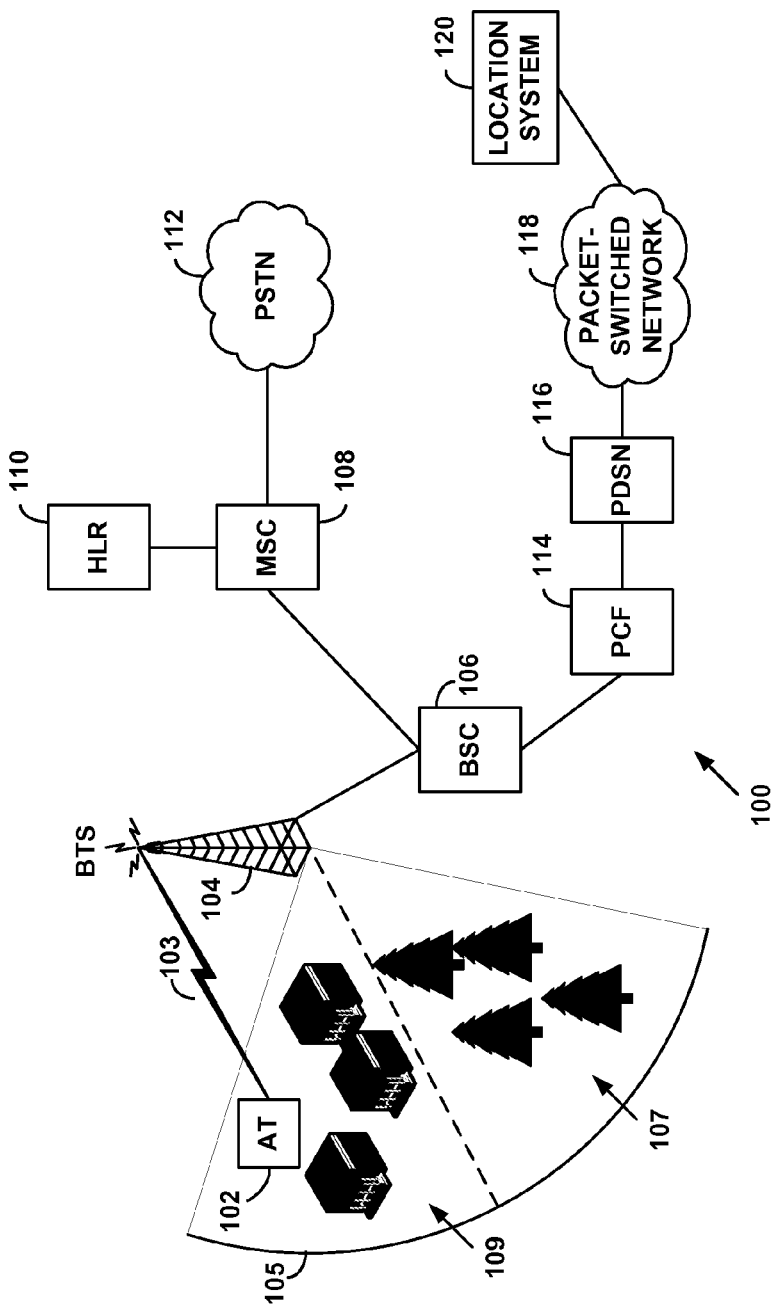
FIG. 1 is a simplified block diagram of a wireless communication system in which an example embodiment of the invention could be carried out.

FIG. 1 shows a simplified block diagram of a wireless communication system 100 that can be operated by a wireless service provider, and in which an embodiment of the invention can be employed. As shown, AT 102 communicates over an air interface 103 with a BTS 104, which is then coupled or integrated with a BSC 106. Transmissions from a BTS to an AT represent the "forward link" to the access terminal, while transmissions from an AT to a BTS represent the "reverse link." AT 102 is located in sector 105, which may be defined through use of directional antennas and/or by various modulation parameters, including, without limitation, carrier frequencies and PN offsets or other parameters. Other parameters, such as an access search window, may also be used to define sector 105. There are two different topologies within sector 105: woodland topology 107 and urban topology 109. AT 102 is located within urban topology 109.

BSC 106 is connected to MSC 108, which acts to control assignment of air traffic channels (e.g., over air interface 103), and provides access to wireless circuit-switched services such as circuit-voice and circuit-data (e.g., modem-based packet data) service. As represented by its connection to PSTN 112, MSC 108 is also coupled with one or more other MSCs, other telephony circuit switches in the operator's (or in a different operator's) network, or other wireless communication systems, thereby supporting user mobility across MSC regions, roaming between systems, and local and long-distance landline telephone services. Also connected to MSC 108 is home location register (HLR) 110, which supports mobility-related aspects of subscriber services, including dynamic tracking of subscriber registration location and verification of service privileges.

As shown, BSC 106 is also connected with a PDSN 116 by way of packet-control function (PCF) 114. PDSN 116 in turn provides connectivity with a packet-switched network 118, such as the Internet and/or a wireless carrier's private core packet-network.

Also connected to PDSN 116 is location system 120. The location system 120 may function to determine and/or report the location associated with the AT 102 (i.e., mobile positioning information). Location system 120 may also function to obtain and report the topographical information associated with a sector, including, for instance, woodland topology 107 and urban topology 109. The types of topologies (i.e., urban, woodland, water, mountain, plains, etc.) and the boundaries of the topologies within the sector may be defined, for example, by a network operator. Location system 120 may also function to obtain and report, for each topology within the sector, a distance extending from the base station associated with the topology. These distances may be entered into location system 120 by, for example, a network operator.

Location system 120 could take a variety of forms. For example, location system 120 may include a mobile positioning center ("MPC") and a position determining entity ("PDE"), and any other entity defined by J-STD-036 or any other system or method, with which those skilled in the art are familiar. Details of a preferred location system may be found in U.S. Pat. No. 7,433,682, the entire contents of which are incorporated herein by reference.

Location system 120 may use various techniques for determining and reporting the mobile positioning information associated with the AT 102. For example, location system 120 could instruct AT 102 to activate a GPS receiver associated with AT 102 and relay the GPS coordinates of AT 102 to location system 120. Location system 120 may also use other techniques to determine the location of AT 102, including but not limited to known techniques such as Enhanced Observed Time Difference (E-OTD), Time of Arrival (TOA), and Angle of Arrival (AOA). Unlike GPS, however, these techniques may require reference beacons or antennas stationed within wireless communication system 100. Location system 120 may use other techniques for determining the position of AT 102 as well.

It should be understood that the depiction of just one of each network element in FIG. 1 is illustrative, and there could be more than one of any of them, as well as other types of elements not shown. The particular arrangement shown in FIG. 1 should not be viewed as limiting with respect to the present invention. Further, the network components that make up a wireless communication system such as system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary AT 102 typically comprises a user interface, I/O components, a communication interface, a tone detector, a processing unit, and data storage, all of which may be coupled together by a system bus or other mechanism. As such, the various systems and entities described herein are collectively representative of examples for implementing and carrying out the various functions, steps, and procedures described herein. Additionally, although various elements (for example, BSC 106 and location system 120) are depicted separately in FIG. 1, two or more elements may be combined into a single device in practice.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group.

By way of example, aspects of an embodiment of the present invention could be implemented in a base station that operates according to the CDMA family of protocols in a wireless communication system. In accordance with an example embodiment, the base station could define a sector through use of directional antennas and/or by various modulation parameters. The base station could also define or limit the sector through the use an access search window. The access search window defines a distance beyond which the base station will not accept access requests from ATs. The access search window may define the distance using, for example, a physical distance (i.e., kilometers), or in terms of chip durations (a chip is the unit of code spreading for CDMA). In CDMA, one chip is approximately 0.8 µs in duration, and the "chip distance" is approximately 244 meters.

The access search window is typically set to a default value. The default access search window value is generally configured as an operating parameter of the system. In use, a base station conventionally operating according to 1X-RTT or EVDO will typically ignore access requests from ATs that are situated beyond the distance defined by the access search window (the base station's determination of an AT's distance away from it is described below), and accept requests from ATs that are within the access search window. As part of an example embodiment, the base station could provide the access search window (or other form of threshold distance) to the access terminal in one or another system message, such as the Systems Parameter Message. Other messages could be used as well to provide the access search window to the AT.

Under both IS-2000 and IS-856, an access terminal in an idle state may request access from a wireless communication system, such as the one shown in FIG. 1, by transmitting one or more access request messages to its serving sector (or other form of coverage area). More specifically, each sector supports one or more "access channels" on its reverse links for receiving access requests from ATs operating in the sector.

An AT seeking access from a particular sector will transmit one or more sequences of access probes on an access channel for that sector, each sequence comprising a system-configurable number of access probe transmissions. Each successive access probe is transmitted at a higher power than the preceding one, with a random delay in between. The delay provides an interval in which the particular sector (for example, the base station) can acknowledge the previous access probe, and the random time between probe helps avoid transmission "collisions" between access probes from different ATs that are seeking access from the same particular sector during the same time frame. Upon receiving an acknowledgement from the particular sector, the AT discontinues further access probe transmissions (if any remain) in the sequence and waits for a channel assignment message from the sector. If no acknowledgement is received within the sequence, the AT may initiate one or more additional sequences of access probe transmissions until it either receives an acknowledgement (and a traffic channel), or gives up attempting to gain access from the particular sector. In the event of failure, the AT may attempt to acquire access from a different sector, using the same procedure.

An access probe comprises an identification of the access terminal seeking access, as well as information specific to the nature of the request, such as the type of call or session being sought, among other possible details. Transmission of the access probe involves spreading or modulating the probe with the PN long code, chip-by-chip. As is known in the art, the PN long code is a pseudo-random sequence of binary values (typically 1s and 0s or 1s and −1s), referred to as chips, that repeats every $2^{42}-1$ values (i.e., has a period of $2^{42}-1$). It is "pseudo-random" because, while the sequence appears largely random and possesses mathematical properties characteristic of random sequences, it is generated deterministically with a fixed period.

Operationally, the PN long code is generated by clocking successive states of a 42-bit shift register ("long code register") at a rate of 1.228 Megahertz. At each clocked state, a 42-bit long code mask is applied to the register contents, and the result is summed modulo-2 to yield a single bit value. This process yields a new bit value at every clock tick (about 0.8 microseconds), and the continuous sequence of bits constitutes the sequence of chips of the PN long code thus generated chip-by-chip at the rate of 1.228 Mega-chips per second. Excluding a register state in which all the bits are zero, there are $2^{42}-1$ unique states that can be achieved before the cycle identically repeats. The generated PN long code thus repeats every $2^{42}-1$ clock ticks (about 41.5 days).

At any given instant, the phase of the PN long code corresponds to which chip of the $2^{42}-1$ chip sequence is generated. In the absence of a long code mask, the phase is determined entirely by the state of the 42-bit long code register at the given instant. For the purposes of the discussion herein, a PN long code so generated (i.e., with no long code mask) shall be referred to as a "pure" PN long code. Any two registers that are in the same state at the same time are synchronized, and their generated pure PN long codes are in phase (i.e., generated with the same phase at the same time). In particular, when an access terminal "acquires the system" (e.g., when it first powers on), the RAN reports to the AT (e.g., in a Sync channel message) the current time and what the state of the long code register will be at a specific, designated time in the future (typically a few milliseconds beyond the current time). The AT then loads its long code register with the reported long code register state, and begins to clock its PN long code generation at the designated time (an exact clock tick). This procedure results in the AT synchronizing with the RAN, thereby generating its pure PN long code in phase with the RAN's (and the overall system's) pure PN long code.

Phase synchronization between the AT and the base station is required because, whereas the AT spreads transmissions to the base station on a chip-by-chip basis, the base station "de-spreads" (or decodes) the transmissions chip-by-chip as the transmissions are received in order to recover the transmitted data. Phase synchronization ensures that both sender (AT) and receiver (base station) are using the same chip sequence to spread and de-spread, respectively, the transmission.

As is known in the art, the effect of applying a long code mask to generation of the PN long code is to shift the phase of the generated PN long code with respect to the pure PN long code, without having to shift the state of the long code register (beyond the nominal clock-driven state evolution). In particular, the access channel long code mask for a given sector (or other form of coverage area) is constructed from the PN offset of the given sector, the base station ID for the sector, the access channel number, and a paging channel number. This information is transmitted from the sector to the AT in one or another system message (e.g., an Access Parameters Message and/or a System Parameters Message) after the AT synchronizes with the system. In applying a particular access channel long code mask during access attempts, the AT thus encodes (spreads) access probes with a PN long code having a phase determined by parameters specific to the particular access channel on which the AT seeks access. The particular sector uses the same access channel long code mask to de-spread (decode) the access probes, therefore generating a PN long code having the same phase as the one used by the AT. To the extent that nearby sectors have different parameters, they will have different access channel long code masks, and will thus generate PN long codes with phases different from the AT's PN long code phase; i.e., they will not recognize the AT's access requests.

Although the respective PN long codes of AT and base station are in phase when the AT transmits an access probe, there is a propagation delay between the time the probe is transmitted and when it is received at the base station (or other RAN element). Consequently, the phase of the base station's PN long code will have advanced by the time the given access probe is received. Operationally, the base station accommodates this delay by searching for signals within its access search window, which, as noted above, may be defined in terms of chips. Specifically, by looking "backward" (or "forward") in the chip sequence with respect to the base station's current phase, the base station can effectively compensate for any propagation delay suffered by an incoming signal (e.g., an access probe) transmitted at an earlier time (and phase), provided the base station searches far enough backward. Since propagation delay corresponds to a distance traveled by the transmitted signal from its source, the base station can use this propagation-induced phase shift to determine the distance to the AT. In this sense, spreading transmissions with the PN long code can be viewed as embedding a distance indicator in the transmissions. Moreover, the base station can exclude from consideration signals transmitted from ATs beyond a distance defined by the access search window. In particular, the base station can set a distance threshold such that signals originating from beyond the threshold distance are ignored (or otherwise not processed and/or responded to).

Accordingly, the base station may use an AT's distance either within or beyond the access search window to determine (possibly with other factors as well) whether or not to provide the requested access. Access probes originating from within the access search window can be processed, and access granted (assuming other factors, such as channel availability, allow it). However, access probes originating from beyond the access search window may be ignored, and the associated access requests denied.

The principles discussed above are illustrated by way of example in FIG. 2. At the top of FIG. 2, an AT 202 is depicted (on the left) as being located 3 km from a BTS 204 (on the right), which has an access search window of 2 km shown as a dashed circular arc. The BTS represents a cell or sector (or other form of coverage area) in to which an AT might transmit an access probe in order to seek access. It will be appreciated that the 2-km access search window is an example, and that other distances (or units of measurement, such as chips), could be used. The AT's distance of 3 km from the BTS is also an example. A conceptual and abbreviated illustration of transmission of an access request 206 is shown below the AT 202 and BTS 204. As noted above, for a spreading rate of 1.228 Mega-chips per second and signal propagation at the speed of light, each chip corresponds to a distance of approximately 244 meters. For the purposes of the simplifying the arithmetic of the present illustration, the distance per chip is rounded to 250 meters, or one km for every four chips. This simplification should not be viewed as limiting with respect to the present invention or embodiments thereof.

In accordance with conventional operation, an access channel long code mask 208 is applied by a PN long code generator 210 of AT 202 to generate a PN long code 212-1. The PN long code is then used to encode 214 (i.e., spread) the access request 206 to yield an access probe 215, which in turn is transmitted to the BTS 204. At the BTS, the same long code mask 208 is applied by the PN long code generator 216 to generate PN long code 212-2, which in turn is used to decode 218 (i.e. de-spread) the received access probe 215. An arrow interrupted by ellipses and pointing from access probe 215 to decode block 218 at the BTS 204 represents the transmission of the access probe, which is associated with a propagation delay corresponding to the distance (3 km) traversed by the transmission.

Figure 2:
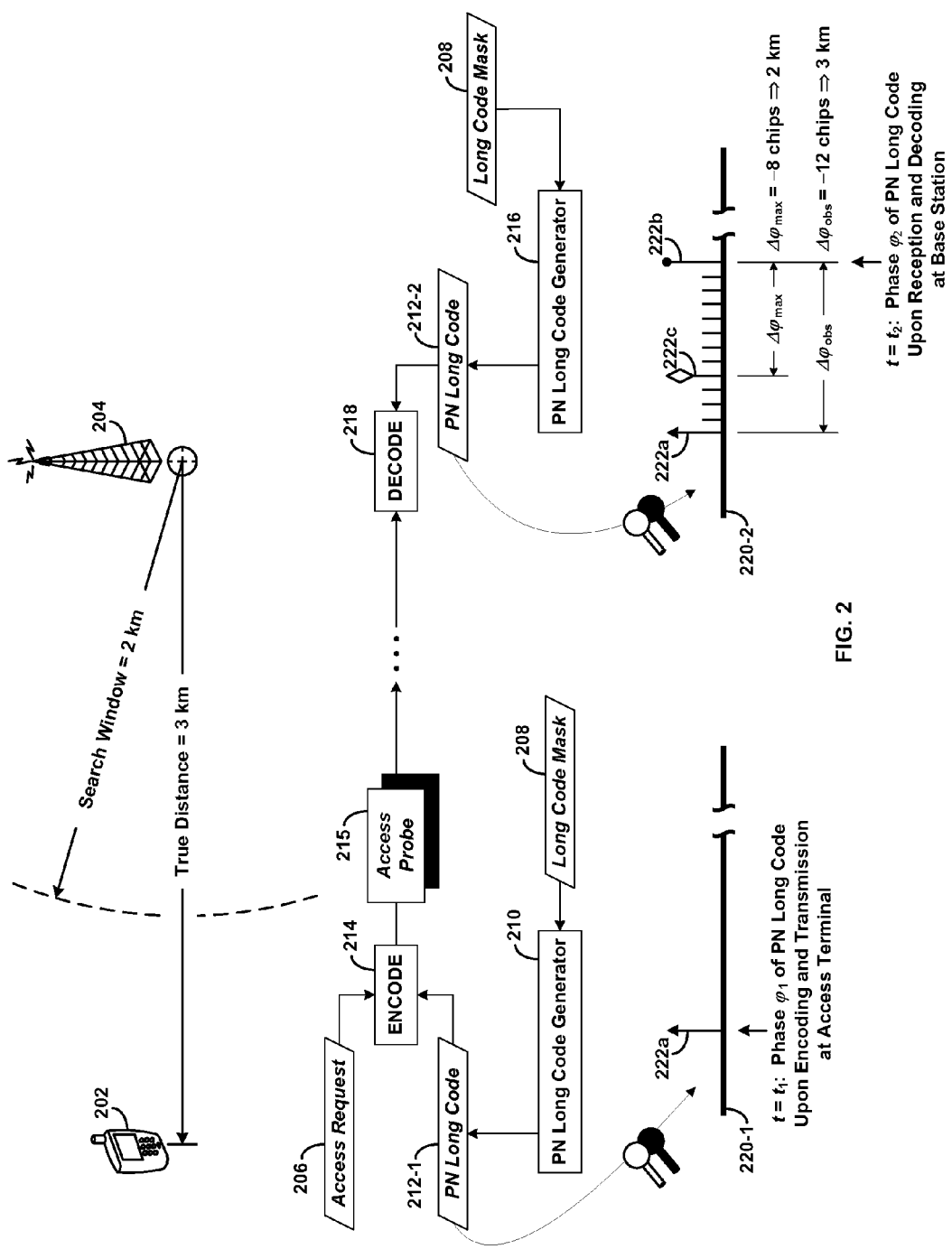
FIG. 2 depicts example operation of conventional encoding and transmitting of an access probe.

The effect of propagation delay on PN long code phase shift measured by the BTS is illustrated at the bottom of FIG. 2. The AT's PN long code 212-1 is depicted in a magnified view 220-1 as a horizontal line representing chip phase on the left side of the figure, while the base station's PN long code 212-2 is similarly depicted in a magnified view 220-2 on the right (magnifying glasses in FIG. 2 represent the conceptual "blow-up" of each PN long code). An upward arrow 222a marks the phase $\phi_1$ of the PN long code 220-1; its location along the chip-phase line in the present illustration is arbitrary. In accordance with conventional operation, the phase $\phi_1$ is determined by the state of the AT's PN long code register at the particular instant of time $t=t_1$ and by the long code mask 208.

A vertical line 222b with a dot at the top marks the phase $\phi_2$ of the base station's PN long code 220-2 upon reception of the access probe at time $t=t_2$. In accordance with conventional operation, the phase $\phi_2$ is determined by the long code mask 208 and the state of the BTS's PN long code register at time $t=t_2$. The magnified view 220-2 also includes line 222a marking phase $\phi_1$ (at time $t=t_1$) for reference, as well as tick marks at each intervening chip between lines 222b and 222a. In the present example, the propagation delay $\Delta t=t_2-t_1$ gives rise to an observed phase shift of $\Delta\phi_{obs}=\phi_2-\phi_1=-12$ chips over the 3 km distance (assuming the approximation of 250 meters per chip). That is, the clock (and the PN long code phase) has advanced 12 ticks (one chip per tick) over time interval $\Delta t$. Finally, a vertical, diamond-topped line 222c marks a maximum allowed phase delay $\Delta\phi_{max}=-8$ chips with respect to $\phi_2$, corresponding propagation of a hypothetical signal across a distance equal to the access search window (2 km in the present example).

In further accordance with conventional operation, the BTS 204 (or other RAN element) will ignore (or otherwise deny) the access probe 215 from AT 202 because the access terminal was beyond the access search window when it transmitted the access probe. As described above, the BTS could either directly compute the AT's distance and compare it to the access search window, or the BTS could use a search window that excludes decoding any signals having phase shifts greater (i.e., more negative) than $\Delta\phi_{max}=-8$ chips (for this example), and therefore originating from beyond the access search window.

Figure 3:
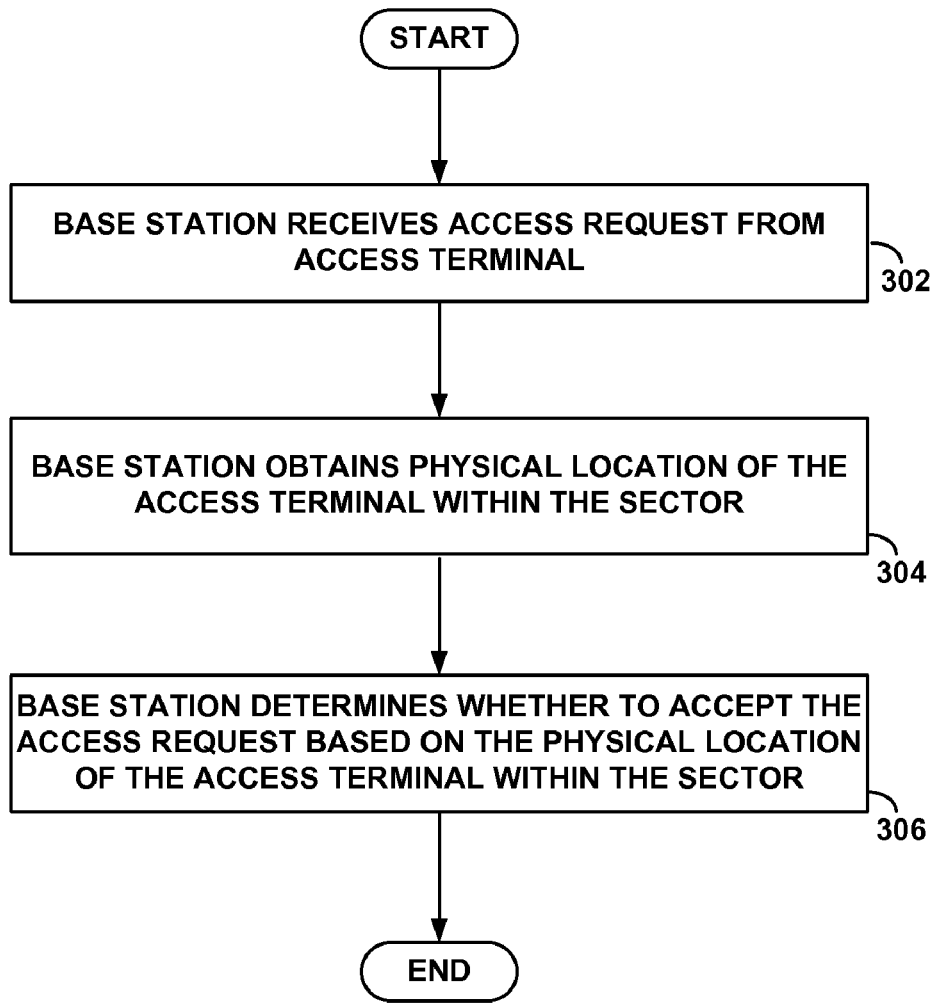
FIG. 3 is a flowchart of a method, in accordance with an embodiment of the invention.

FIG. 3 is a flow chart of a method, in accordance with an embodiment of the invention. Generally, FIG. 3 depicts a method of a base station determining whether to accept an access request from an AT based on the physical location of the AT within a sector served by the base station. As shown in FIG. 3, at step 302, a base station receives an access request from an AT that is located within a sector served by the base station. The sector may be defined in any of the manners discussed above. At step 304, in response to receiving the access request, the base station obtains the physical location of the AT within the sector. The base station may request the location of the AT from a location system, such as location system 120. Location system 120 may obtain the location of the AT by using, for example, any of the methods discussed above (e.g., E-OTD, TOA, AOA, GPS, etc.). In addition to receiving the physical location of the AT, the base station may receive from the location system topographical data associated with the sector. For example, the topographical information may identify the different topologies in the sector, the physical boundary associated with each of the topologies identified in the sector, and a distance extending from the base station associated with each of the topologies identified in the sector. By way of example, assume that the sector is sector 105 from FIG. 1. The base station would receive from location system 120 information about woodland topology 107 and urban topology 109, including the physical boundaries of those topologies, and a distance extending from the base station for woodland topology 107 and urban topology 109.

At step 306, the base station determines whether to accept the access request based on the physical location of the AT within the sector. To do so, the base station may identify the topology corresponding to the physical location of the AT (for example, urban topology 109). The base station may then determine the AT's physical distance from the base station, for example, by comparing, the GPS coordinates of the AT with the GPS coordinates of the base station (or using any other method). The base station may be hard-coded with its own GPS coordinates, or could obtain them from location system 120. If the AT is within a distance associated with the topology in which it is located, the base station accepts the access request. If the AT is beyond the distance, the base station rejects the access request. It should be understood that the distance associated with the topology may be different than the access search window. By way of example, an AT could be within the distance defined by the access search window, but beyond the distance associated with the topology in which it is located. In such a situation, the base station would reject the access request from the base station.

Figure 4:
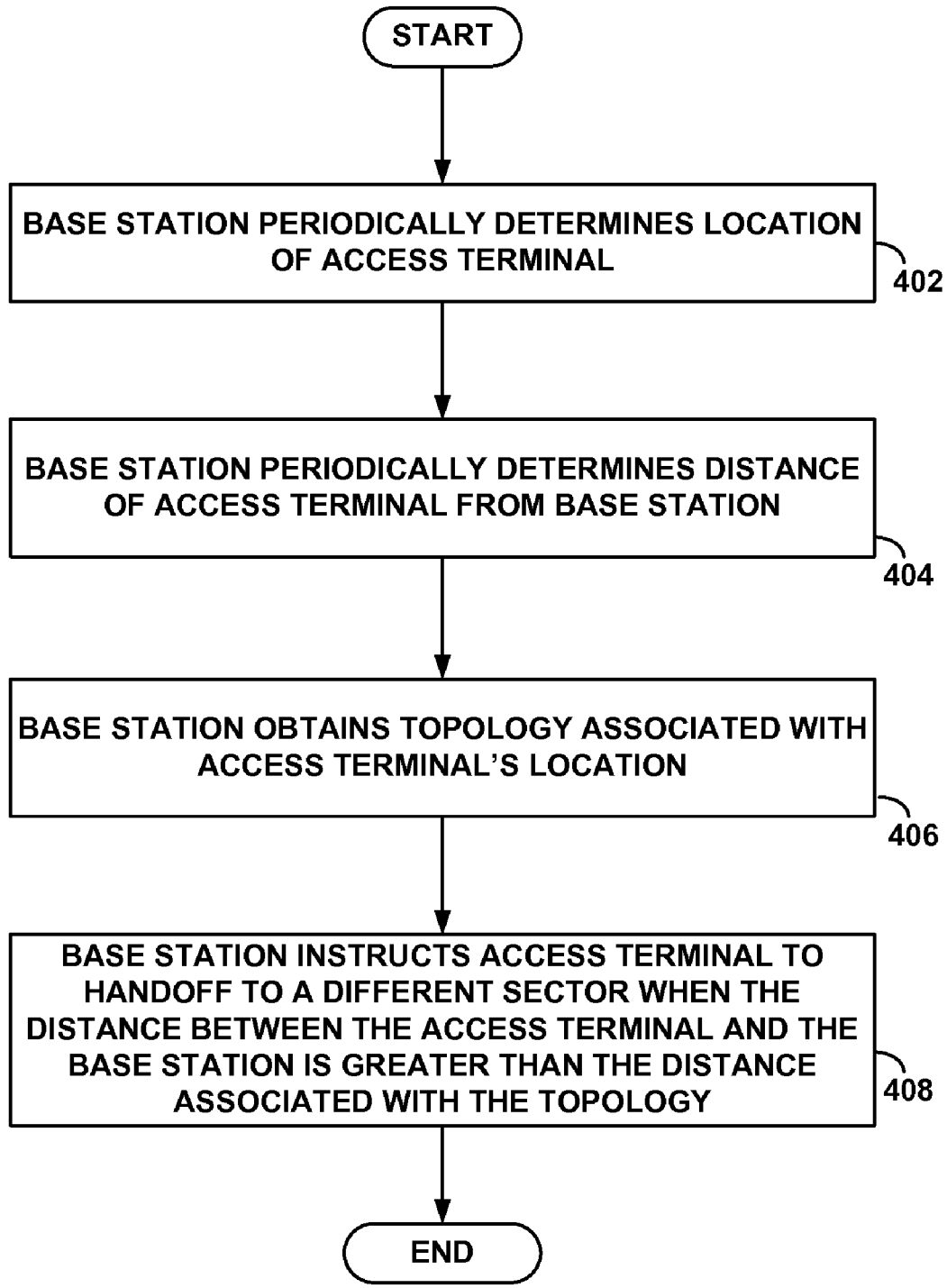
FIG. 4 is a flowchart of a method, in accordance with an embodiment of the invention.

FIG. 4 is a flow chart of a method, in accordance with an embodiment of the invention. Generally, FIG. 4 depicts a method in which a base station periodically determines the location of an AT that is within a sector served by the base station, and selectively instructs the AT to handoff to another sector based on the AT's position and the topology associated with the AT's position. As shown in FIG. 4, at step 402, the base station periodically determines the location of an AT that the base station is currently serving. The base station could obtain the location of the AT from location system 120, for example. Alternatively, the base station could request the location of the AT from the AT itself. At step 404, the base station periodically determines the AT's distance from the base station (for example, by comparing the GPS coordinates of the AT with those of the base station). At step 406, in response to determining the AT's location, the base station determines the topology associated with the AT's location. The base station may obtain topology information from location system 120. The topology information may include a distance extending from the base station associated with the topology (for example, 50 km for "woodland" topology and 25 km for "urban" topology). At step 408, the base station instructs the AT to handoff to a different sector when the distance between the AT and the base station is greater than the distance associated with the topology. It should be understood that the different sector may be a sector served by the base station, or by another base station.

Figure 5:
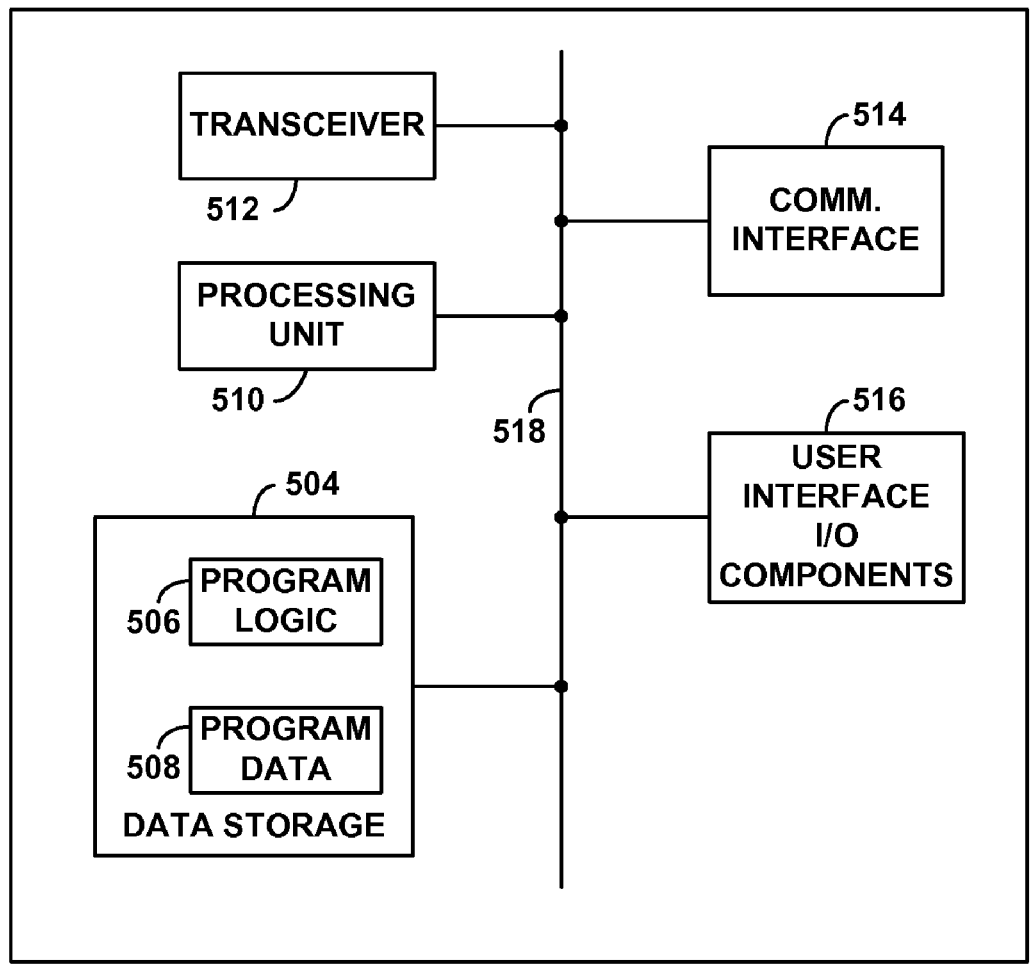
FIG. 5 is a simplified block diagram of an exemplary base station.

FIG. 5 is a simplified block diagram depicting functional components of an example base station that can carry out aspects of the present invention. As shown in FIG. 5, the example base station includes data storage 504, processing unit 510, transceiver 512, communication interface 514, user-interface I/O components 516, and a system bus 518 or other mechanism.

These components may be arranged to support conventional operation in a wireless communication network that is compliant with the CDMA family of protocols, such as network 100 illustrated in FIG. 1. The details of such an arrangement and how these components function to provide conventional operation are known in the art, and are not described further herein.

Communication interface 514 in combination with transceiver 512, which may include one or more antennas, supports forward and reverse-link channels for communications with the network, including receiving and responding to access request messages, and the transmission and reception of various system messages discussed above that convey access request information, synchronization information, BTS location information, and access search window information, etc. Interface 514 may also incorporate support for reception of the PN long code in accordance with an example embodiment. The communication interface may include a module, such as an MSM™-series chipset made by Qualcomm Inc. of San Diego, Calif., and support wireless packet-data communications according to the CDMA family of protocols.

Processing unit 510 may comprise one or more general-purpose processors (e.g., INTEL microprocessors) and/or one or more special-purpose processors (e.g., dedicated digital signal processor, application specific integrated circuit, etc.). In turn, the data storage 504 may comprise one or more volatile and/or non-volatile storage components, such as magnetic or optical memory or disk storage. Data storage 504 can be integrated in whole or in part with processing unit 510, as cache memory or registers for instance. Data storage 504 may be configured to hold both program logic 506 and program data 508.

Program logic 506 may comprise machine-language instructions that define routines executable by processing unit 510 to carry out various functions described herein. For example, the program logic, communication interface, and transceiver may operate cooperatively to carry out logical operation such as that discussed above and illustrated in FIGS. 3 and 4. Further, program data 508 may be arranged to store algorithms for determining and comparing distances and topologies, as described above. Program data 508 could also comprise storage for various parameters of the methods (e.g., topologies, topology boundaries, etc.) also discussed above.

Figure 6:
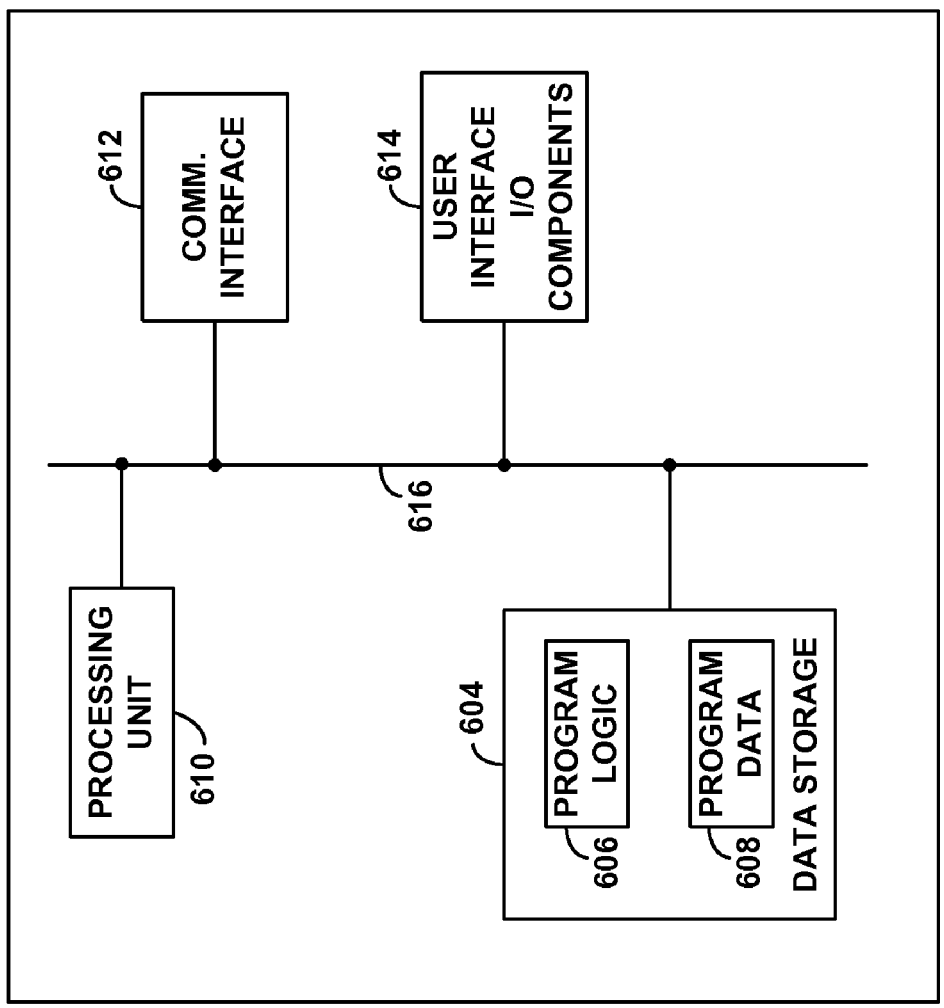
FIG. 6 is a simplified block diagram of an exemplary location system.

FIG. 6 is a simplified block diagram depicting functional components of an example location system that can carry out aspects of the present invention. As shown in FIG. 6, the example location system includes data storage 604, processing unit 610, communication interface 612, user-interface I/O components 614, and a system bus 616 or other mechanism.

Communication interface 612 may include one or more communication-interface mechanisms that enable the entity to communicate with various other entities. As such, the communication interface may take various well-known forms, depending on factors such as the type of communication links in use.

Processing unit 610 may comprise one or more general-purpose processors (e.g., INTEL microprocessors) and/or one or more special-purpose processors (e.g., dedicated digital signal processor, application specific integrated circuit, etc.). In turn, the data storage 604 may comprise one or more volatile and/or non-volatile storage components, such as magnetic or optical memory or disk storage. Data storage 604 can be integrated in whole or in part with processing unit 610, as cache memory or registers for instance. Data storage 604 may be configured to hold both program logic 606 and program data 608.

Program logic 606 may comprise machine-language instructions that define routines executable by processing unit 610 to carry out various functions described herein. For example, the program logic, communication interface, and transceiver may operate cooperatively to carry out logical operation such as that discussed above and illustrated in FIGS. 3 and 4. Further, program data 608 may be arranged to store topology data, including the type of topologies within sectors within communication system 100, as well as the boundaries of those topologies, and distances extending from the base station associated with those topologies. This data may be table data, and may be stored as a database. Additionally, program data 608 may include location data of ATs located in sectors within communication system 100. Also, program data 608 may include algorithms for determining the location of the ATs (for example using the methods discussed above). And certainly other possibilities exist as well.

Embodiments of the present invention have been described above. Those skilled in the art will understand, however, that changes and modifications may be made to this embodiment without departing from the true scope and spirit of the invention, which is defined by the claims.

We claim:

1. A method comprising:
receiving, by a base station, an access request from an access terminal, wherein the access terminal is physically located within a first distance from the base station, and wherein the first distance is defined by an access search window;
in response to receiving the access request, determining, by the base station, (i) a physical location of the access terminal, and (ii) a specific geographical topology in which the access terminal is physically located, wherein the specific geographical topology contains structure that interferes with signals communicated between the access terminal and the base station;
if the access terminal is physically located within a second distance from the base station, wherein the second distance is associated with the specific geographical topology, accepting, by the base station, the access request; and
if the access terminal is physically located beyond the second distance, rejecting, by the base station, the access request.

2. The method of claim 1, wherein determining the physical location of the access terminal comprises requesting the physical location of the access terminal from a location system.

3. The method of claim 2, wherein the location system, in response to receiving the physical location request, determines the physical location of the access terminal using an angle-of-arrival technique.

4. The method of claim 2, wherein the location system, in response to receiving the physical location request, determines the physical location of the access terminal using a time-of-arrival technique.

5. The method of claim 2, wherein the location system, in response to receiving the physical location request, determines the physical location of the access terminal using GPS coordinates of the access terminal.

6. The method of claim 1, wherein the specific geographical topology is an urban topology.

7. A system comprising:
a base station, wherein the base station includes a processor and data storage, wherein the data storage contains program logic that, upon execution by the processor, causes the base station to:
receive an access request from an access terminal, wherein the access terminal is physically located within a first distance from the base station, and wherein the first distance is defined by an access search window;
in response to receiving the access request, determine (i) a physical location of the access terminal, and (ii) a specific geographical topology in which the access terminal is physically located, wherein the specific geographical topology contains structure that interferes with signals communicated between the access terminal and the base station;
if the access terminal is physically located within a second distance from the base station, wherein the second distance is associated with the specific geographical topology, accept the access request; and
if the access terminal is physically located beyond the second distance, reject the access request.

8. The system of claim 7 further comprising a location system, wherein determining the physical location of the access terminal comprises requesting the physical location of the access terminal from the location system.

9. The system of claim 8, wherein the location system is arranged to determine the physical location of the access terminal using an angle-of-arrival technique in response to receiving the physical location request from the base station.

10. The system of claim 8, wherein the location system is arranged to determine the physical location of the access terminal using a time-of-arrival technique in response to receiving the physical location request from the base station.

11. The system of claim 8, wherein the location system is arranged to determine the physical location of the access terminal using GPS coordinates of the access terminal in response to receiving the physical location request from the base station.

12. The system of claim 7, wherein the specific geographic topology is an urban topology.

* * * * *